United States Patent [19]

Parzych

[11] 4,199,268
[45] Apr. 22, 1980

[54] FOOD PROCESSOR

[75] Inventor: Joseph F. Parzych, New Britain, Conn.

[73] Assignee: Dynamics Corporation of America, Greenwich, Conn.

[21] Appl. No.: 952,381

[22] Filed: Oct. 18, 1978

[51] Int. Cl.² .............................................. B01F 7/26
[52] U.S. Cl. .................................... 366/306; 99/461; 366/315; 426/474; 366/604
[58] Field of Search .............. 366/604, 199, 200, 205, 366/206, 315, 302, 306; 99/459, 460, 461, 463, 464, 465; 426/519, 474

[56] References Cited

U.S. PATENT DOCUMENTS

| 111,907 | 2/1871 | Chapman | 99/459 |
|---|---|---|---|
| 131,821 | 10/1972 | Hutchins | 99/459 |
| 1,036,159 | 8/1912 | Sperry | 366/306 |
| 2,063,692 | 12/1936 | Martinet | 366/200 |
| 2,562,790 | 7/1951 | Houston | 366/200 |
| 2,858,117 | 10/1958 | Girton | 366/302 |

*Primary Examiner*—Robert W. Jenkins
*Attorney, Agent, or Firm*—Watson D. Harbaugh

[57] ABSTRACT

The invention relates to an improved, novel method and time saving food processor and process, easily assembled and cleaned, and safely operably for whipping egg whites, or cream, and making butter, in seconds, in which two elements define two flat surfaces disposed and coacting at a right angle with respect to each other in a circular container. One of the flat surfaces is centrally rotated in a horizontal plane in the circular container to centrifugally direct and progressively drive a stream of liquid food products against the other flat surface in the presence of air, at a substantially high speed and with hard impact. The other flat surface continuously redirects the flow radially inwardly to recycle it with a continuous high frequency.

9 Claims, 4 Drawing Figures

FOOD PROCESSOR

BACKGROUND OF THE INVENTION

Although cream has been whipped heretofore by interaction between two relative moving elements one of which is rotational, the operation has been slow because of slow repetition of contact for the increments of cream.

Whipping cream and beating eggs has been accomplished domestically essentially by interdigitating blades slicing the material with a peripheral movement that is comparably slow even when conventionally powered by a universal motor through a worm driven transmission. Wire whisks and various hand powered tools have also been used for many years. In all of these, particularly with the powered implements, the moving elements not only are dangerous for injuries to fingers and hands of the operator but the surfaces engaging the ingredients and the number of engagements are limited, in time for individual increments of material thereby prolonging the operation. Moreover, the elements employed are difficult to clean, particularly when working with dairy cream where a detergent and brush should be used to clean the tools and equipment.

Also, with many rotating kitchen tools having blade edges and wires engaging the food, only a comparatively small portion of the driving or working surfaces of the tools contact the food being processed. In most instances, to accomplish acceptable results substantial lengths of time are involved, many times acknowledged phychologically as periods of time within which some other culinary task can be done.

If liquid food mixtures were to be struck by any of the flat side of blades the splatter would be intolerable. Consequently cavitation by interdigitating beaters is a good example of the general relationships developed wherein liquid food is engaged by the sharp edges of blades on two shafts, possibly eight in number, generally interdigitating and travelling at a speed of 6 to 8 inches per revolution with the 8 blade edges travelling a total of 48 to 64 inches of edge cutting contact per revolution for the two interdigitating beaters, and providing 48,000 to 64,000 inches of edge contact per minute if completely submerged but with a rotating bowl and liquid food moving in the same direction of movement and outwardly away from interdigitating beater blades, and, the effective beater impacts are greatly reduced for each increment of material involved in a given time.

However, a pint of cream to be whipped at 1000 R.P.M. would engage not to exceed a third of the height of the beaters, leaving 16,000 to 21,000 inches of contact per minute effective, edgewise only for the operational work. Edgewise, the processing effect upon the cream is comparatively slight to avoid spinning the bowl and spilling the contents.

Furthermore, the time required for continuous operation and the cleanup are discouraging unless large quantities are involved and then, even though the beaters are processing a deeper mixture, there is much additional time required to contact repeatedly all of the contents adequately. Large and small food mixer bowls are required for efficiency if time, economy and volume are a consideration, particularly with home appliances.

Compared with interdigitating beaters requiring a slow moving bowl to avoid spilling, in the present invention, the bowl is held stationary and a horizontally revolving six inch disk at 1800 R.P.M. moves and impacts every molecule of cream as much as a thousand times a minute against a vertical stationary flat deflecting plate of large area, without splatter, at high speeds between 37,000 and 56,000 inches per minute at an effective R.P.M. of 1000, whereas conventional interdigitating beaters, having eight interdigitated blades not operable above 1000 R.P.M. impacts slow moving cream at 18,000 inches per minute with substantially less effectiveness and greatly less frequency per molecule of cream.

SUMMARY OF THE INVENTION

In the present invention it was discovered that a circular flat disk approximately six inches in diameter, having an upstanding cylindrical hub approximately two inches in diameter, thereby providing 18 to 25 square inch areas of working area where centrifugal forces would be appreciable and supporting the liquid on its upper surface and rotated at a constant processing speed of 1800 R.P.M. in the presence of air, to centrifugate and drive it progressively against a vertical blade that keeps it on the disk, would whip a pint of heavy cream to a non-flowing condition, in eight to ten seconds, or medium cream in fifteen to twenty seconds, and then, if desired, churn it into butter or buttermilk in three to four minutes.

This was accomplished by driving the cream against a vertical stationary flat deflecting blade having a lower edge portion of a length substantially equal to the exposed outer 2" radius of the disk, and almost touching the disk, and goemetrically disposed normal to a downstream radius of the disk with its outer edge in close proximity to the circular wall of the bowl to provide a radially narrow flow-way between its inner edge and the cylindrical hub.

In operation, the cream is whipped, and then churned if desired, with a percussive effect of being driven against the stationary blade that slows and deflects the cream inward radially to pass through a half inch gateway next to the cylindrically walled hub, and, therebeyond again be centrifugally spread radially progressively outwardly therefrom repeatedly to go around again and again, strike the blade and be impacted and rolled radially inwardly for each time for a repeat cycle. The fluidity of the cream at first provides the initial repeat cycles for whipping the cream and if "whipping" is continued the "milk" from which the butter fat is being churned also provides a fluidity, lubricity and lack of stickiness which accomplishes also a "working" of the butter although a manual working may also be performed if desired.

The angle of the coaction of the reaction plate to the feed and the reaction paths for the cream on the horizontal disk is optimum for centrifugating and accelerating the material present on the exposed surface of the spinning disk to provide repeated violent contacts.

IN THE DRAWINGS

DESCRIPTION OF THE INVENTION

Figure 1:
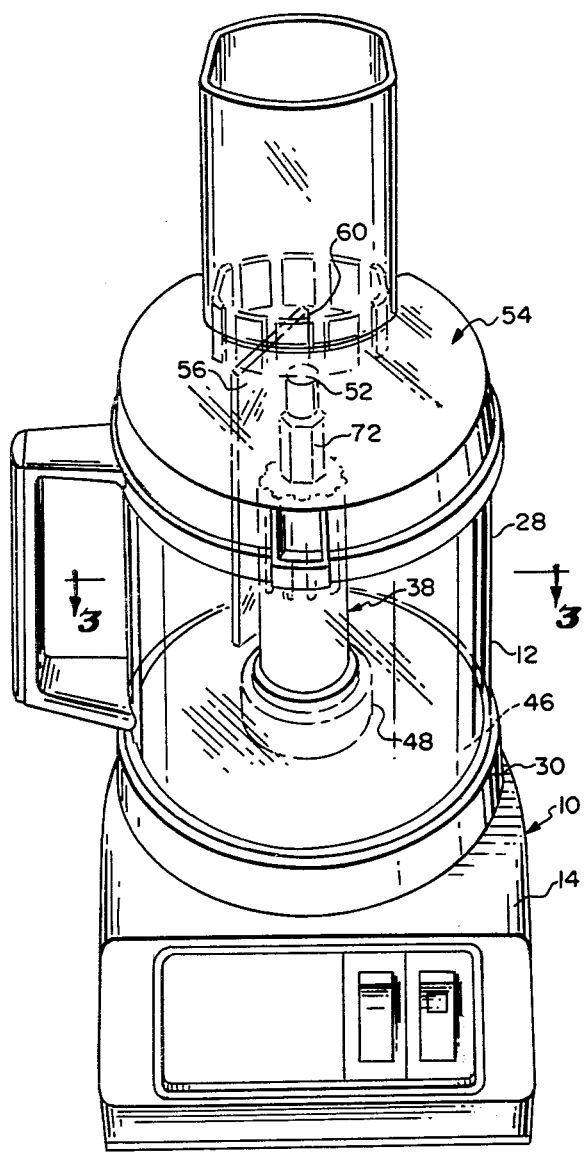
FIG. 1 is a front perspective view of the food processor embodying the invention, including the power unit, set up to whip cream, and make butter if desired, or beat egg whites.
Figure 2:
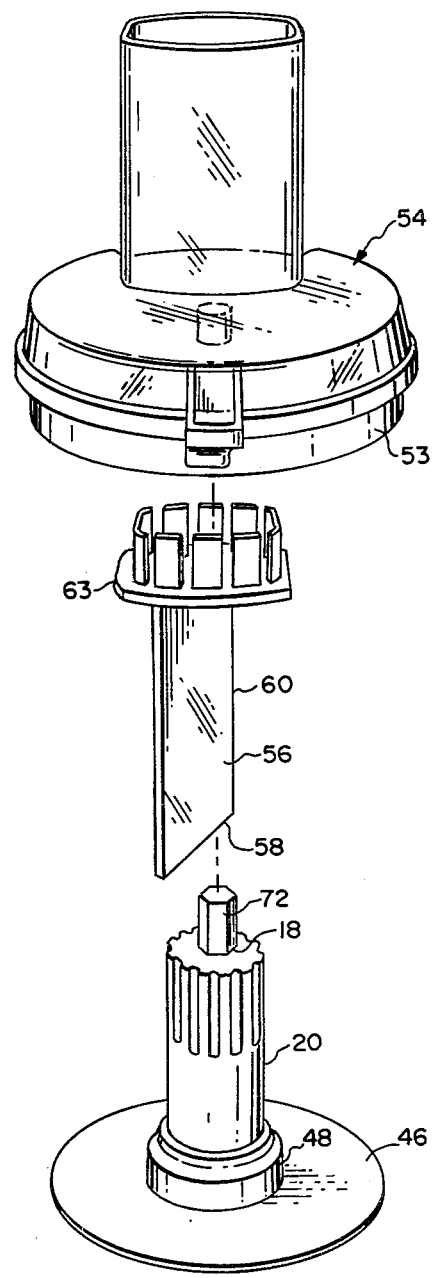
FIG. 2 is a vertically exploded view of the four elements when dissembled for detail inspection.
Figure 2:
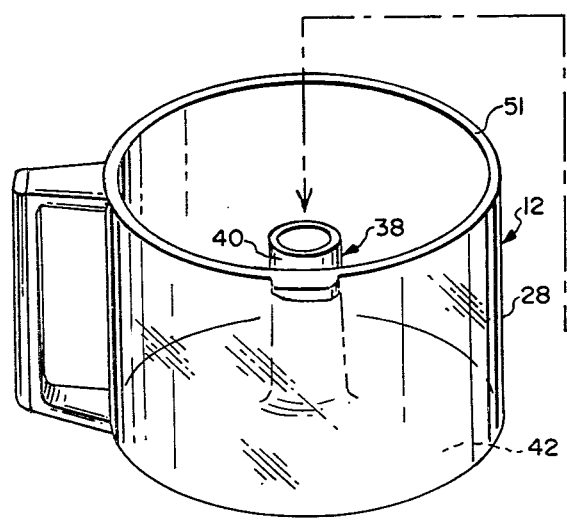
Figure 3:
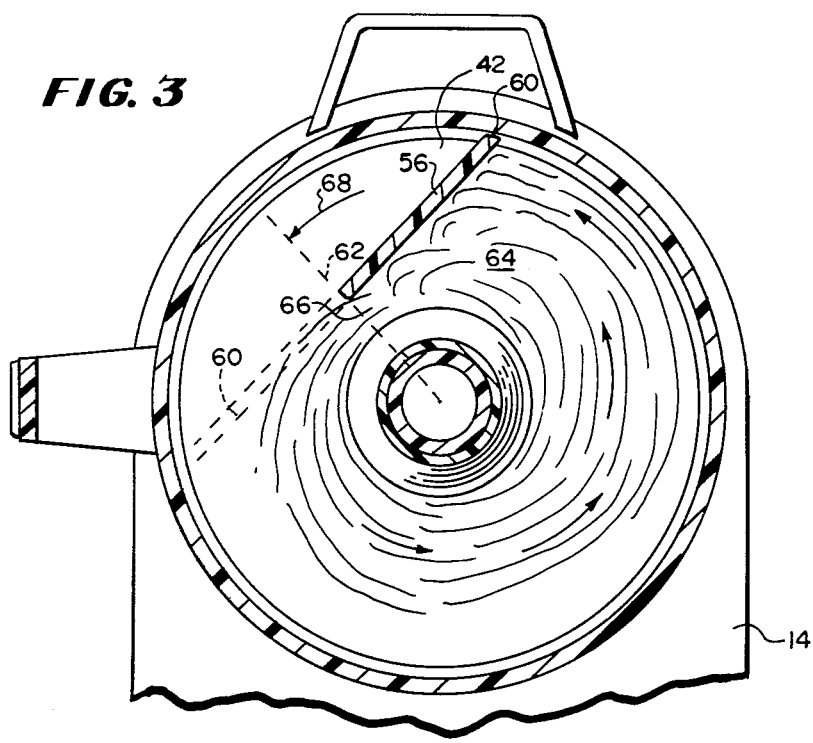
FIG. 3 is a sectional view of the bowl taken on line 3—3 in FIG. 1, indicating the major flow of the material on the rotating flat disk surface.
Figure 4:
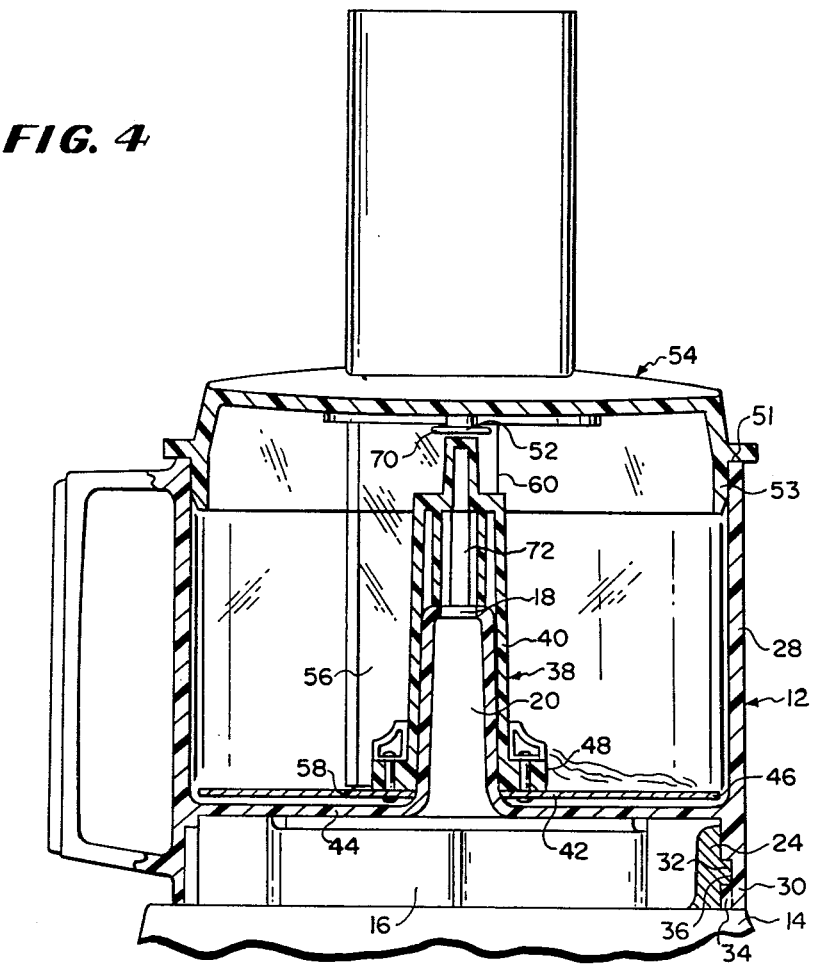
FIG. 4 is a vertical sectional view of the bowl taken at a right angle to the line 3—3 in FIG. 1.

Referring now to the drawings in further detail, the invention is illustrated and will be described in connection with a food processor having a flat bottomed cylindrical space approximately six inches in diameter and four inches deep, in which small quantities as well as substantial quantities of cream or egg whites can be whipped in much less time than with conventional interdigitating beaters or whisks, and afterwards, requires much less clean up.

Safetywise the bowl 12 and cover must be sequentially mounted and dismantled with respect to the base 14 and it is the final movement of the cover on the bowl that actuates a serially connected safety switch after assembly. Once the cover is in place the safety switch turns off with any counter movement of the cover alone or of the bowl the same limited distance, before being turned far enough for removal as when the cover clears the post carrying the switch safety lock which as integrated with the base also shields against tampering with the serially connected safety switch.

The cover has an end thrust bearing stop which provides a running stop that holds detachable cutters and tools in their working position and frees them for ready manual lift-off from the drive shaft, when changing them without disturbing the bowl. Accordingly changeable rotatable tools can be used singly or in tandem merely by spacing them on the shaft, it being possible to support special blades close to the bottom opening in the chute for collection and further processing of material below the blade.

The multi-purpose food processor 10 is illustrated as constructed and assembled for whipping cream, making butter and beating egg whites in a bowl 12 receivable on a motor housing 14 having a constant speed motor 16 of 1800 R.P.M. housed in it. Viewed from above, the motor 16 runs counterclockwise and drives a vertical shaft 18 extending upwardly through the top thereof as journalled in a high tapered tubular housing portion 20 concentrically located on the top of the motor housing 14. The shaft 18 terminates upwardly in an exposed elongated hexagonally sectioned telescoping, true-running clutch member 22 for drive engagement well above the vertical center of the bowl 12 for receiving tools thereon in drive aligned relation concentric with the circular wall 28 of the bowl 12.

Marginally the bowl has a depending flange 30 which telescopes downwardly over a cylindrical reduced upper end portion 24 of the housing having a radially directed stop button 32 which is received through a throat 34 in a bayonet joint recess 36 that is provided for safety purposes in the internal wall of the depending bowl flange 30.

Once the bowl is non-rotatively supported in place on the housing 14, a processing member 38 having a vertical hub 40 carrying a horizontal circular flat disk 42 at its bottom is received in drive supported relation upon the hexagonal portion 26 of the shaft 18 and the disk 42 is located a short distance above and just clears the bottom 44 of the bowl. The edge of the disk 42 extends into close clearing relationship with the vertical cylindrical wall 28 of the bowl. The hub 40 defines a cylindrical wall of appreciable height above and contiguous with the circular disk 42. The upper end of the hub 40 preferably ends in an upwardly directed end thrust bearing surface 52 for holding the disk member in place against vertical movement.

The cover 54 is received on the upper edge 51 of the bowl preferably in locked relationship against rotation and removeably carries a downwardly extending prefereably flat blade 56 whose lower edge 58 closely clears the disk with the vertical edge 60 preferably beveled to barely clear or engage the vertical cylindrical wall 28 of the bowl 12.

The lower edge 58, in width, is preferably not less than the exposed radius 62 of the disk 42 and is supported offset as at 63 at the top of the cover to assure only one mounting orientation which geometrically defines at its lower edge 58 approximately one half of a chord 60 that is normal to a radial line 62 at the trailing edge of blade 56 to provide not only a baffle that is struck progressively and repeatedly by the rotated liquid contents 64 of the bowl driven by the rotating disk 42 to violently turbulate their movement but also to provide a flow opening 66 between the baffle 56 and the cylindrical wall 48 of the hub which serves as an exit for the deflected flow of fluid therebetween that opens initially in the direction of rotation 68 of the disk at the slower surface speed of rotation at the smaller radius of the disk 42, at this point, yet is subject to appreciable centrifugal forces for centrifugation as it leaves the flow opening 66. Thus, the cylindrical wall 48 keeps the fluid flowing without stagnation at the center of the disk 42.

IN OPERATION

Cream or egg whites placed on the disk 42 rotating at approximately 1800 R.P.M. constitute a liquid body of substantial depth which is frictionally engaged at its interface with the disk for the disk to accelerate and centrifugate the lower layer portions that are primarily in contact with it each revolution and thereby progressively overcome radial inertia in the upper strata to progressively centrifugate them also but at a slower acceleration. The centrifugal force and inertial slippage outwardly of progressively lower strata also increases with an increasing effective radii and the ingredients are progressively and finally spread radially effectively every revolution of the contents, and with intense turbulence, are propelled and impacted against the baffle plate 56 which immediately reduces greatly their circular speed with further intense turbulence and progressively aerates and deflects the liquid contents 64 inwardly through the opening 66 again and again for repeated treatment.

After the first few revolutions of the disk 42 the deflected ingredients form a flowing pattern for the continuous flow of impacted liquid at an unexpectedly slow speed through the opening 66. This brings all liquid to a substantial depth within one-half inch of the cylindrical wall 48 where rotational speed and centrifugal force is minimized and the shearing frictional drive effect of the disk engagement is predominantly upon the lowermost layers to progressively move and centrifugate them faster and faster out from under other portions remaining above, which then drop down into closer frictional relation with the disk and are successively moved radially outward, with the progressively increasing radii of the flow accelerating the centrifugation and speed of the particles into a compositely wide path where they flow against the blade 56 and repeatedly are turbulated to entrain air for aeration.

The ultimate result in less than one revolution is that the liquid contents spread radially outwardly into the path of the reaction plate, and, any remaining behind uncentrifugated is the next in turn to be in contact with the disk at the opening and be the first beyond the opening to be centrifuged to carry radially with it portions above it.

Thus, all lower layers are accelerated and move outwardly more rapidly than upper layers and in each revolution each particle has centrifugated radially outwardly from under the flow of liquid through the opening and with many revolutions have been miscellaneously and progressively high and low in the flowing stream at the opening 66 with the paths of flow leading to contact with the blade 56 for fast radial spread, acceleration, shear and aeration.

Rotational slippage of liquid material with respect to the disk never permits the bowl contents to attain enough rotational centrifugal force to permanently occupy a particular position with respect to the stationary cylindrical wall 12. Thus the contents collectively provide a substantially constant path in which, in the presence of air, liquid particles are repeatedly impacted with varying degrees of force to accommodate aeration which can ultimately be quite fine in its texture.

The angle of the reaction plate 56 and the flow opening 66 it controls could be reduced but it has been found that the optimum relation with a constant speed 1800 R.P.M. motor driving the disk is for a six inch disk having its center vertical hub wall 48 approximately two inches in diameter and the space between it and the reaction plate 56 approximately one-half inch wide.

For the purpose of cleanliness and economizing the users time and costs, and to eliminate possible variables, the power shaft is electrically driven at substantially a constant speed and, is dynamically braked when turned off. The cutting or processing tools are each designed for their respective optimum operation at the single speed of the motor.

The opening of either one or both of two serially connected switches initiates a dynamic braking that stops the motor rotation generally in less than two seconds and thereby provides also an added safety feature, which brakes the motor and the high inertia of tools before a person can remove the cover to gain manual access to the bowl or manually contact cutters only after they have stopped turning.

What is claimed is:

1. The method of whipping cream comprising rotating a horizontal flat surface upon which gravity initially supports flowable cream,
   marginally retarding rotational movement of the flowable cream by a stationary vertical cylindrical surface at the periphery of the flat surface,
   centrifugally driving and progressively propelling the supported cream horizontally in the stationary cylindrical vertical surface at an acute angle against a vertical stationary flat surface above and disposed chordal and normal to the rotating surface in close proximity thereto at the intersection of their planes to repeatedly agitate the cream and move the agitated cream progressively in a chordal direction towards the center of rotation to clear the radially outer portions of the flat surface, and thereby reducing the degree of centrifugal force effective on the cream to a smaller radius, and repeatedly centrifugating the cream and moving it from said smaller radius in rotationally outwardly spreading arcs into repeated violent contacts with the stationary flat surface in relation to fluidity at a rotational speed above a thousand R.P.M.

2. The method defined in claim 1 including the stop of flowing the cream radially outwardly progressively on the flat surface for progressively varying portions to engage the stationary flat surface repeatedly at different impact speeds.

3. The method defined in claim 1 including confining cream to a minimum radius circular path of flow on said flat surface for progressively restoring it to an increasing centrifugal force that moves the cream radially outwardly into paths of rotation of increasing speeds of movement substantially effective over the radial width of the stationary flat surface while maintaining varying substantial centrifugal forces upon the cream at all times.

4. The method of whipping cream comprising rotating two flat elements with respect to each other one horizontally supporting cream on it with respect to the other vertically at a right angle between them for high impact adjacent to the major radius of contact in a stationary cylindrical surface and at substantially a progressively increasing obtuse angle with respect to the radii of the rotational flow for slowing the flow of impacted cream and positively returning the flow of impacted cream under turbulent churning effect to a path at a minor radius of said rotation.

5. The method of whipping a fluid food product comprising rotating a horizontal flat disk at a constant speed about a vertical axis below and contiguous to a vertical blade geometrically defining a flat impact surface extending chordally to the upstream edge of the disk for impacting food products carried against it on the disk at various chordal radii, camming the products progressively towards the center of the disk, and rotating the disk at approximately 1800 R.P.M.

6. Rotating a circular cream supporting flat surface about a vertical axis disposed chordal and parallel to a stationary upright flat surface disposed normal to and located about the rotating surface and in close proximity thereto at the intersection of their planes for moving and agitating cream thereon against the stationary surface at an acute angle to the direction of flow to aerate and move the cream progressively towards the center of rotation and reduce the centrifugal force on the cream for it to pass the inner edge of the flat surface within the radius of the inner edge of the upright flat surface where it is normal to a radius of rotation tangentially to an inner flow path and progressively recentrifugating the cream passing therebeyond outwardly into a radially widening path for repeated impact against the stationary flat surface.

7. A liquid food processor comprising,
   a base member housing and prime mover means having a constant speed and direction of rotation,
   a bowl shaped member having a substantially cylindrical side wall portion and a central bottom portion concentrically receiving a vertical output drive shaft of said prime mover means,
   a circular disk member having a hub member received in supported drive engagement upon said vertical shaft with the disk portion disposed at the bottom of the bowl to revolve with its periphery in close clearance with the cylindrical side wall portion, a cover received upon said bowl and supported against rotation in said direction of rotation, a depending stationary blade means supported by the cover extending at one side of said hub member in close proximity with the wall of the bowl and at its lower end into close proximity to the disk with the plane of the blade disposed substantially tangent to an inner flow path on said disk with the other vertical edge spaced from said hub an appreciable distance to determine and direct flow of liquid between said blade and hub that is deflected radially inwardly along the lower edge.

8. A butter churn comprising a flat circular disk defining a circular horizontal support surface whose minor diameter is approximately one third its major diameter defined by a central wall, means for rotating said circular disk at a speed above 1000 R.P.M. to provide concentric surface paths of progressively increasing lineal speeds, a cylindrical stationary wall disposed concentrically with the outer edge of the outer circular path, and a vertical flat blade having a lower edge approximately equal in width to said one third diameter disposed on a line defining a chord normal to a radius of said disk at its downstream edge to provide a flow passageway between it and said central wall and having a vertical edge closely contiguous with said cylindrical stationary wall at its upstream edge.

9. A butter churn comprising a circular disk approximately six inches in diameter having a hub defining a rotationally supported vertical wall substantially two inches in diameter and a stationary vertical wall surrounding the outer edge substantially six inches in diameter, baffle means defining a stationary vertical flat plate having a lower edge approximately two inches long disposed tangentially in close proximity to the disk and extending from the vertical wall in a downstream direction normal to a radius of said disk and terminally spaced approximately one half inch from the vertical wall of said hub for deflecting material on the circular disk radially inwardly towards said hub, and means for advancing the circular area coincident with said vertical flat surface at a speed progressively varying from approximately 25 to 50 foot seconds of movement.

* * * * *